UNITED STATES PATENT OFFICE.

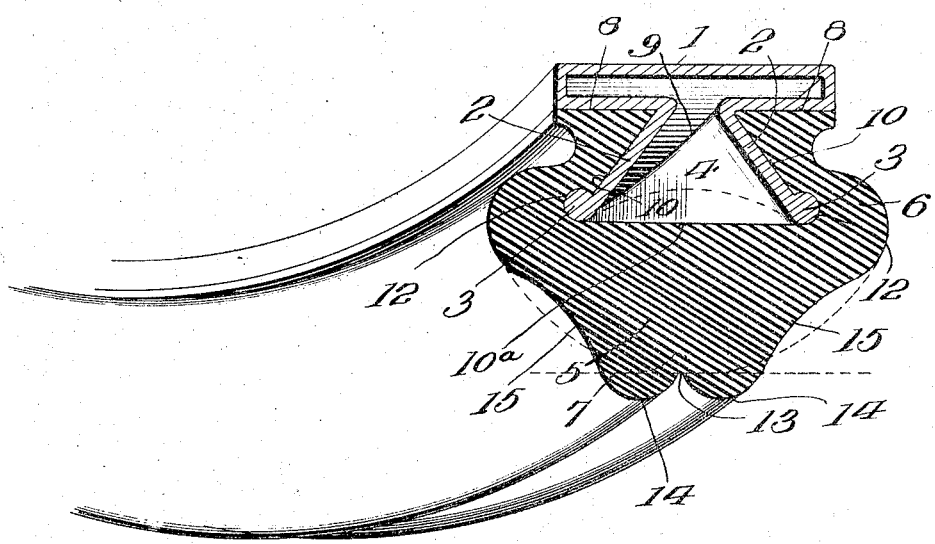

WILLIAM B. ESTES, OF WEST ORANGE, NEW JERSEY, ASSIGNOR OF ONE-HALF TO MILLARD F. AMONETT, EDWARD L. AMONETT, AND JAMES M. AMONETT, OF WEST ORANGE, NEW JERSEY.

TIRE.

1,186,472.  Specification of Letters Patent.  Patented June 6, 1916.

Application filed November 10, 1914. Serial No. 871,388.

*To all whom it may concern:*

Be it known that I, WILLIAM B. ESTES, a citizen of the United States, residing at West Orange, in the county of Essex and State of New Jersey, have invented certain new and useful Improvements in Tires, of which the following is a specification.

My invention relates to improvements in tires.

The object of the invention is to provide a rubber tire with an inner annular air space of such shape as will permit of the body of rubber directly in line with the tread, to be compressed when load strain occurs, and simultaneously prevent outward expansion of the rubber between the tread surface and the tire base.

A further object of the invention is to provide improved means for supporting the rubber tire on the felly of the wheel.

The invention also comprehends improvements in the details of construction and arrangement of parts, which will be hereinafter described and particularly pointed out in the claims.

The accompanying drawing represents a detail perspective section of my improved tire.

The numeral 1 indicates a preferably annular hollow base, formed with outwardly flared annular flanges 2—2, provided at their ends with beads 3—3. The flanges 2—2 form a substantially V-shape annular recess 4, the reduced portion of the V being next to the base 1. The base may of course be made solid, but for convenience, and to reduce the weight, I preferably make it hollow. The base 1 is driven on the felly in any suitable manner in order to fasten it to the wheel.

The tire 5 comprises a body portion 6, the outer portion thereof tapering toward the tread surface as shown at 7. The base of the body portion is flat in a transverse plane to fit on corresponding portions 8 on the base 1, and in the body portion is an inverted V-shape opening 9. The outer wall 10ª of this opening is parallel with the axis of the wheel, and at the juncture of the inclined walls 10, and the horizontal wall 10ª, of the opening 9, are enlargements 12, to receive the beads 3.

The reduced tread surface is formed with an annular depression 13, which forms two spaced convex ribs 14, forming the tread surface. The sides of the tire incline outwardly toward the base, the surfaces of the sides being concave, as indicated at 15.

When the tire is placed on the base, the walls 10 of the inverted V-shape opening fit snugly the inclosed walls of the flanges which extend from the base 1, as clearly shown in the drawing.

When in use the body of the tire is of sufficient thickness to afford the necessary resiliency, and when an obstruction is encountered the rubber body portion yields and is forced into the V-shape opening, as shown in dotted lines in the drawing, thus taking the shock from the vehicle. When the tire is compressed by encountering an obstruction, or by unusual load pressure, the concave side walls are forced out, as indicated in dotted lines. This performs a very important function, in that it adds an increased compressed body of rubber adjacent the beads 3, whereby cutting of the rubber is avoided.

I find that by forming the tread surface as described, it prevents the tire skidding, due to the fact that the depression 13, acts as a suction cup when the ribs are compressed toward and from each other.

By forming the base with a V-shape opening, the rubber tire is stretched across the same, consequently when load pressure occurs, or an obstruction is encountered, it forces the rubber into the opening and simultaneously tightens the side portions on the flanges, and increases the gripping action. In other words, by straddling the body portion of the rubber tire across the wide portion of the V-shape opening, the rubber becomes stretched and acts in principle the same as a belt stretched between two pulleys.

It is to be understood that any suitable fastening means may be employed for attaching my improved tire to a wheel.

What I claim is:

1. A tire comprising a base having outwardly spaced flared flanges and horizontal flanges extending from the flared flanges, the outer surfaces of the horizontal flanges being flat, a rubber body portion fitted on the base the inner surfaces of the rubber body portion being flat and engaging the flat outer surfaces of the horizontal flanges, said body portion having an annular substantially V-shape recess which receives the spaced flared flanges.

2. A tire comprising a base having two outwardly flared spaced flanges formed with beads at their outer ends, the outer portions of the base each side the flanges being flat, a rubber body portion formed with an annular recess and stretched over the flared spaced flanges, the rim wall of said body portion being parallel to the axis of the tire and engaging the flat surfaces of the base, the flared spaced flanges engaging the side walls of the recess.

3. A tire comprising a base provided with spaced flaring flanges and two horizontal flanges, and a body portion provided with an annular recess in which fits the flaring flanges, the body portion being flat on its inner side and engaging the horizontal flanges, said body portion tapering toward the tread surface and formed with an annular depression in the center of said tread surface, whereby two parallel ribs are formed, the outer walls of the body portion being concave.

4. A tire comprising a rubber body portion formed with a substantially V-shaped annular opening and having flat rim engaging surfaces and a base having flat surfaces against which the flat rim surfaces engage, said base having outwardly projecting rigid means which fit in the V-shaped opening for supporting the body portion to maintain the outer walls of the opening in a stretched condition irrespective of load strain.

In testimony whereof I affix my signature in presence of two witnesses.

WILLIAM B. ESTES.

Witnesses:
MICHAEL BUCKLEY,
FREDERICK EYNER.